United States Patent

[11] 3,582,046

[72] Inventors Edward E. Mueller;
Marvin C. Mueller, both of Minneapolis, Minn.
[21] Appl. No. 825,006
[22] Filed May 15, 1969
[45] Patented June 1, 1971
[73] Assignee Whirl-Air-Flow Corporation
Minneapolis, Minn.

[54] BLENDING AND TRANSPORTING APPARATUS FOR DISCRETE MATERIALS
17 Claims, 8 Drawing Figs.
[52] U.S. Cl............................................. 259/4, 259/36
[51] Int. Cl...................................................... B01f 15/02
[50] Field of Search............................................. 259/4, 95, 18, 36, 60

[56] References Cited
UNITED STATES PATENTS
2,884,230  4/1959  Pyle.............................. 259/4
3,148,865  9/1964  McClellan..................... 259/4
3,158,362  11/1964  Seifarth......................... 259/180
3,179,379  4/1965  Grun............................. 159/4
3,409,273  11/1968  Kelly............................ 259/4

Primary Examiner—Robert W. Jenkins
Attorney—Merchant & Gould

ABSTRACT: A closable pressure vessel is shown having a funnel-shaped lower portion with an outlet opening at the small diameter bottom end. Aerator pads are mounted on the inner wall of the lower portion to fluidize material in the vessel. Air jet fittings are also mounted on the inner wall of the lower portion to provide pulsating air jets to blend the fluidized materials in the vessel. A diffuser pad is mounted between said outlet opening and an outlet conduit to aid in fluidizing the materials during blending, and to aid in causing the blended materials to flow from the vessel through the outlet opening into the outlet conduit for transporting to a remote location.

INVENTORS.
EDWARD E. MUELLER
MARVIN C. MUELLER
BY
Merchant & Gould
ATTORNEYS

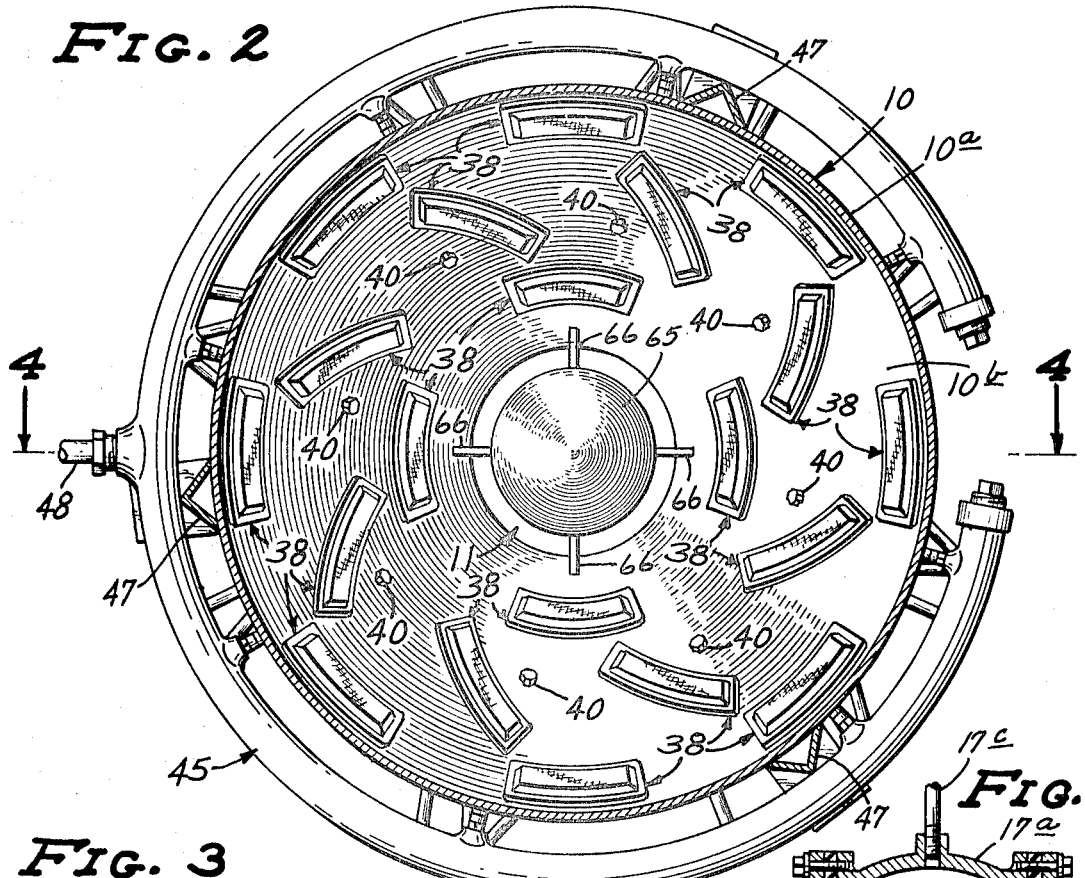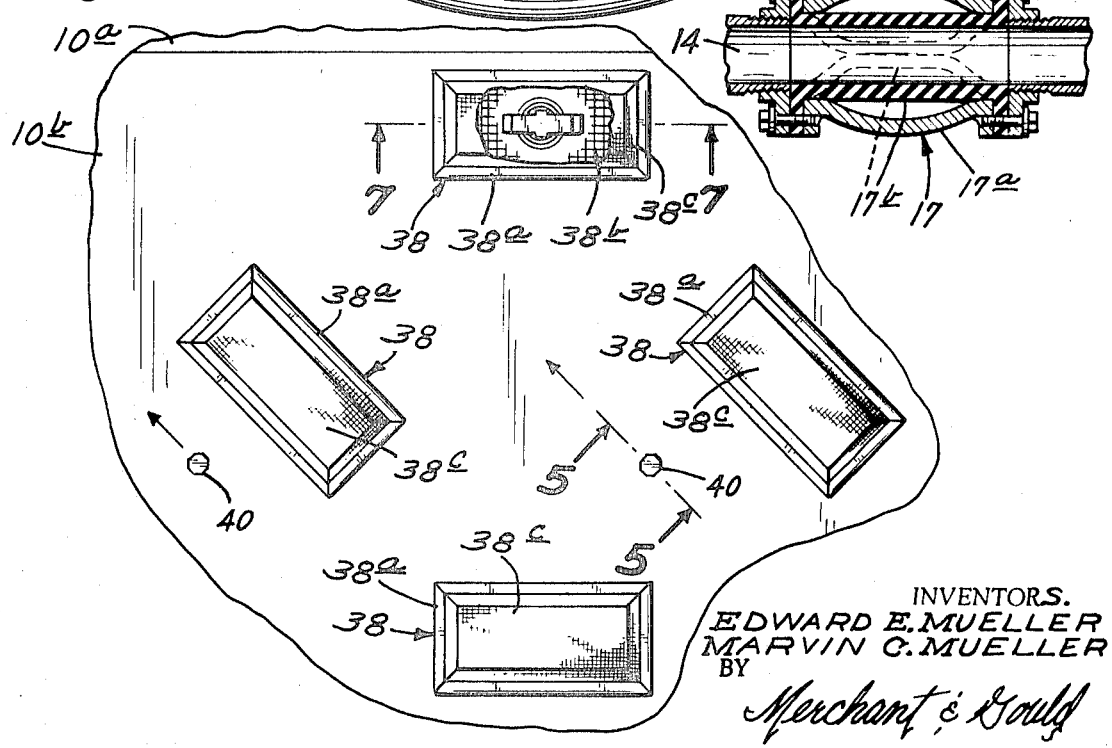

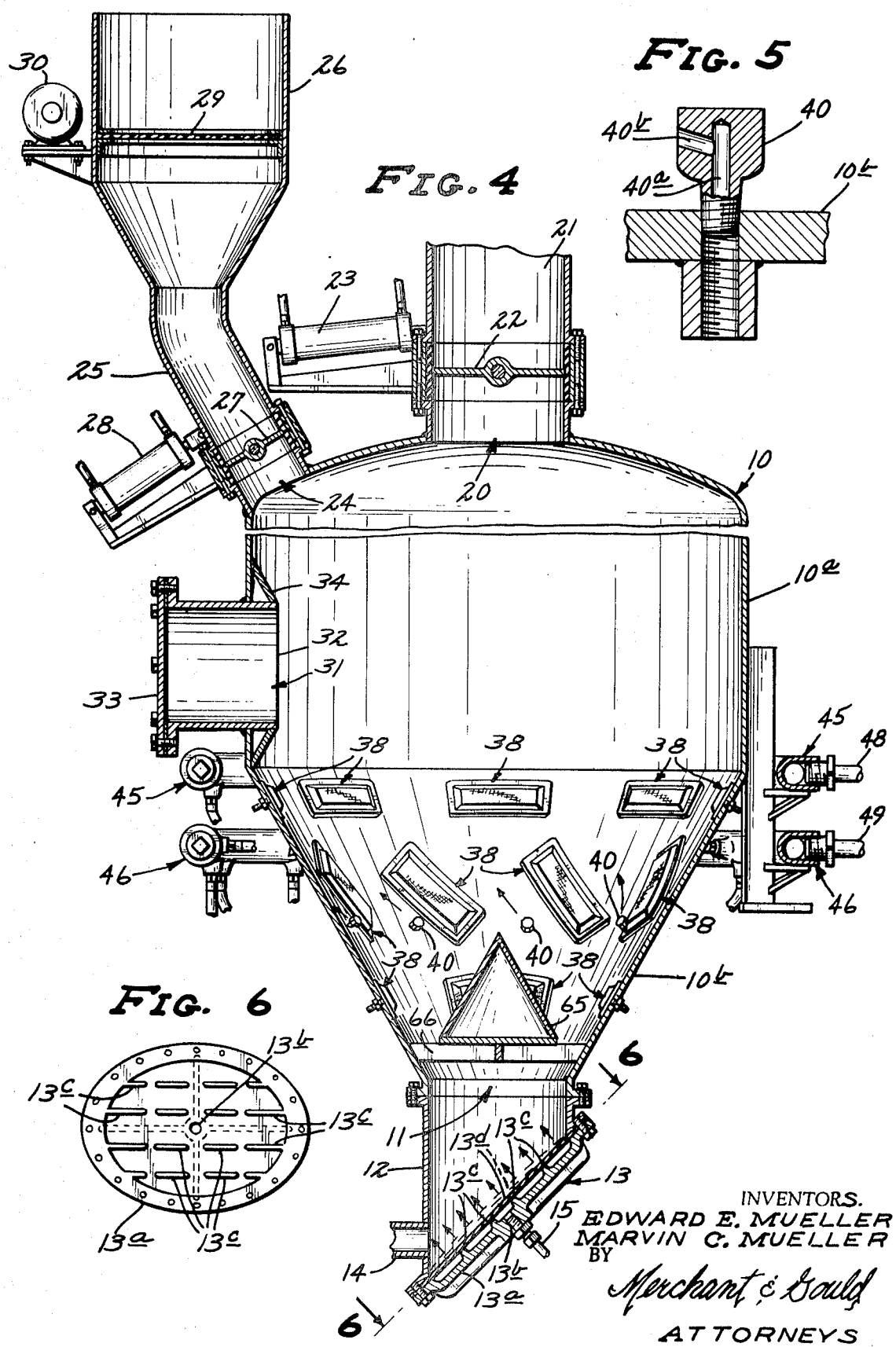

BLENDING AND TRANSPORTING APPARATUS FOR DISCRETE MATERIALS

BACKGROUND OF THE INVENTION

1. Field of the Invention

This invention relates generally to the art of fluidizing discrete materials for blending and transporting purposes, and more particularly relates to a novel structure for and method of blending such materials in a vessel by aerating the material and subjecting it to air jets, and subsequently transporting the blended material from the vessel to a remote location by further fluidizing means.

2. Description of the Prior Art

Many different industries use blending equipment and transporting equipment to mix and transport various discrete materials. Various quantities and types of powdered or granular materials can be mixed in many different ways. Mechanical drum-type mixers can be used as well as blenders employing sampling techniques. A method of blending that employs sampling techniques is shown in the Seifarth U.S. Pat. No. 3,158,362 that issued Nov. 24, 1964. Some of the problems with prior art mechanical mixers are discussed in that patent. A problem with the method disclosed in the Seifarth patent is that the thoroughness of mixing is limited by the number of diverse locations from which the samples are taken.

Attempts have also been made to blend various materials in a container by aerating or fluidizing the material and then in some way cause it to mix. None of the prior art systems that we are aware of, however, utilize our novel approach to obtaining a complete blending of a mixture of discrete materials.

Various devices have also been developed to transport material from a tank or hopper to a remote location. For example the Anselman et al. reissue U.S. Pat. No. 24,716 that issued Oct. 6, 1959 discloses a system for fluidizing discrete material contained in a funnellike tank and transporting it from the tank through a conveyor pipe to a remote location. Air under pressure is used in the Anselman system to both fluidize and transport the material. However, Anselman does not perform any blending or mixing function. Another type of apparatus that has been used to fluidize the material in a tank and force it through a conduit to a remote location is a diffuser pad as shown in the Lau U.S. Pat. No. 2,936,994 that issued May 17, 1960. Again, however, the Lau patent does not disclose the fluidizing type transporting device in combination with apparatus to blend a mixture of different materials.

SUMMARY OF THE INVENTION

Our invention provides apparatus and method for both blending and transporting mixtures of discrete materials. The material to be mixed is placed in a tank and subjected to low-pressure air to fluidize the whole mass of material. To blend the material, it is subjected to pulsating high-pressure air jets. These pulsating air jets cause the material to mix completely and form a homogenous mass. After the blending is completed, the pulsations are discontinued, and the blended, still fluidized mass is removed from the tank through a bottom opening and, by means of a diffuser pad, caused to flow through a transport conduit to a remote location. The diffuser pad is used not only to transport the material but also to aid in fluidizing the material during the blending operation. In general, we use low-pressure air to fluidize the whole mass of material, and pulsed high-pressure air to stir, agitate and mix the fluidized mass. After the blending operation is completed, we use medium pressure air to fluidize and transport the material to a remote location.

BRIEF DESCRIPTION OF THE DRAWINGS

FIG. 2 is an enlarged horizontal sectional view taken along line 2—2 of FIG. 1;

FIG. 3 is an enlarged plan view of a portion of the inner wall surface of the vessel shown in FIG. 2;

FIG. 4 is a vertical sectional view of the blending and transporting apparatus, taken along line 4—4 of FIG. 2;

FIG. 5 is an enlarged, sectional view of a jet nozzle taken along line 5—5 of FIG. 3;

FIG. 6 is a plan view of the base of the diffuser pad, taken along line 6—6 of FIG. 4;

FIG. 8 is an enlarged view in vertical section of the shutoff valve mounted in the conduit leading from the diffuser pad.

DESCRIPTION OF THE PREFERRED EMBODIMENT

Figure 1:
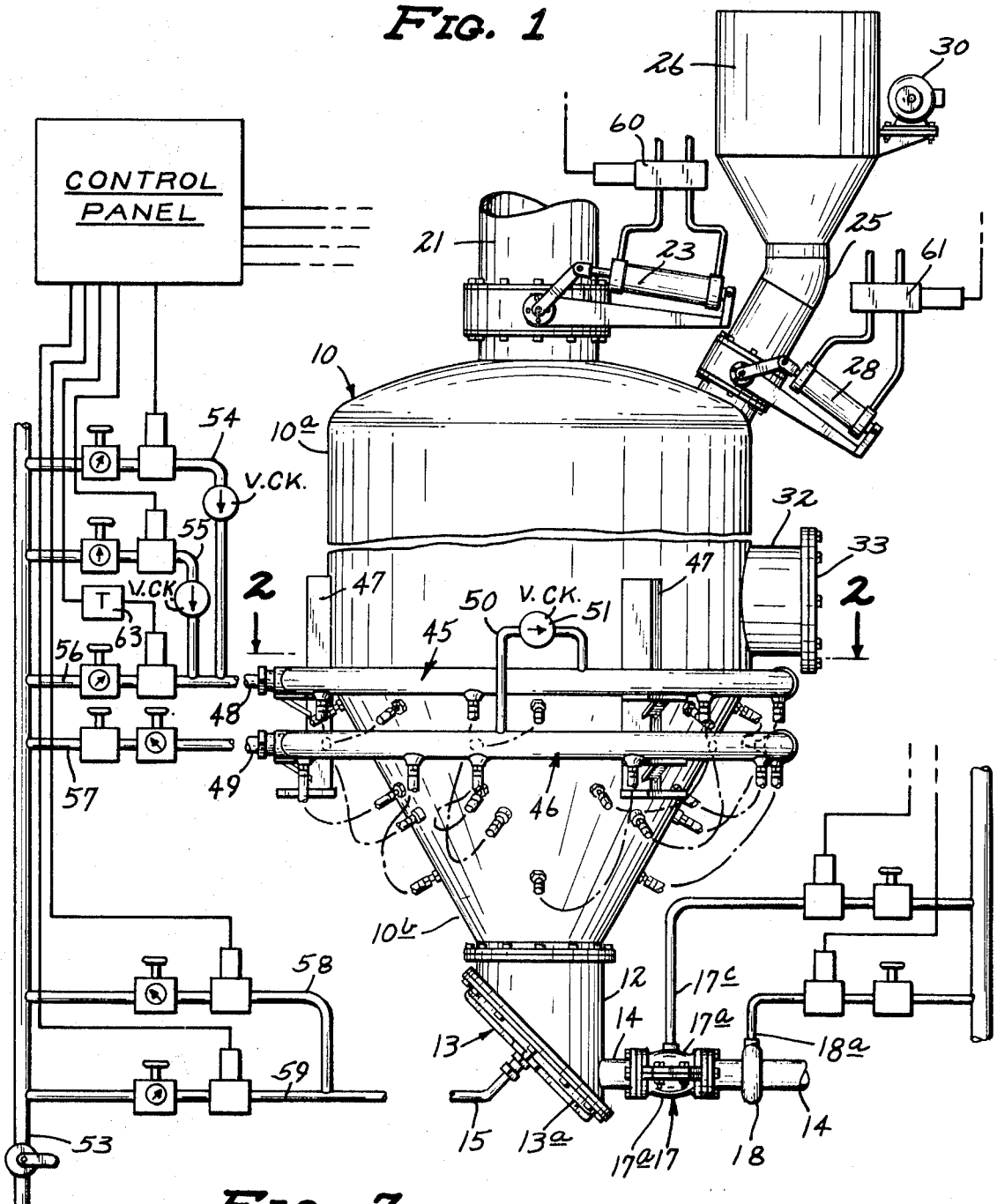
FIG. 1 is a view in side elevation of the blending and transporting apparatus of our invention, including a schematic representation of a control system therefor, portions of the system being broken away.

In the drawings, like numerals will be used throughout the several views to indicate like elements of the invention. A pressure vessel or tank 10 is shown having a cylindrical upper portion 10a and a generally conical lower portion 10b converging downwardly from the upper portion to a circular material outlet opening 11 at the bottom end thereof. Securely attached to lower portion 10b around opening 11 is a tubular member 12 having a diffuser pad 13 bolted to its lower end. Diffuser pad 13 is mounted at approximately a 45° angle with respect to the horizontal, and faces a material outlet conduit 14 mounted in the wall of tubular member 12.

Diffuser pad 13 has a support plate 13a with a center opening 13b to which is secured an air supply conduit 15. The inner face of support plate 13a is provided with a series of raised ridges 13c, as best shown in FIGS. 4 and 6. A canvas or other porous material 13d is stretched tightly across the inner face of plate 13a and secured around its edges as shown in FIG. 4. Air under pressure thus enters through opening 13b and is distributed over the entire surface of canvas 13d because the raised ridges 13c prevent the canvas from being pushed tightly against the face of plate 13a. As the structure and function of diffuser pads are well known to those skilled in the art, no further detailed description is believed necessary. The previously mentioned Lau U.S. Pat. No. 2,936.994 can be referred to for a discussion of diffuser pads.

Material outlet conduit 14 is provided with a shutoff valve 17, and downstream therefrom a booster 18. Valve 17 has a two-piece housing 17a in which is carried a rubber or rubber-like sleeve 17b. The position of sleeve 17b is controlled by air entering housing 17a through a tube 17c. Under normal atmospheric pressure conditions, sleeve 17b assumes the fully open position shown in full lines in FIG. 8. When air under pressure is introduced through tube 17c, the sleeve collapses to the dashed line position in FIG. 8 to close off the conduit 14. The particular valve 17 used in the preferred embodiment is manufactured by the Red Valve Company Inc. Carnegie, Pennsylvania.

Booster 18 is preferably a hollow ring having openings that communicate into the interior of conduit 14. Booster 18 is provided with air under pressure by means of a supply pipe 18a. The purpose of booster 18 is to enhance the movement of the material through conduit 14. The structure and operation of booster 18 are fully described in the Anselman et al. U.S. Pat. No. Re. 24,716.

Vessel 10 has a generally dome-shaped cover with a material inlet opening 20 therein. Mounted around and extending upwardly from opening 20 is a tubular inlet conduit 21 having a butterfly valve 22 mounted therein. The position of valve 22 is controlled by an air motor 23. Valve 22 is constructed to insure positive shut off, both to prevent material from entering the tank and to prevent air under pressure from escaping form the tank. The particular valve used in the preferred embodiment is a series 100 Keystone butterfly valve manufactured by Keystone Valve Corp., Houston, Texas.

Another opening 24 is provided in the top of vessel 10 to permit air to escape from the vessel during the blending operation. Extending upwardly from opening 24 is a conduit 25 having at its upper end a hopperlike portion 26. A positive shutoff butterfly valve 27 operated by an air motor 28 is mounted in conduit 25. In the preferred embodiment, this is also a Keystone butterfly valve. A suitable filter or screen 29 is mounted within hopperlike portion 26 to filter out material being carried by the air escaping therethrough during the blending operation. An electric motor 30 is mounted on hopperlike portion 26 and is provided with eccentric apparatus to continuously shake filter 29 during the blending operation. This continuous shaking of the filter causes the material being deposited thereon to break loose and fall back into vessel 10.

The inner walls of the upper portion 10a of tank 10 are smooth and free of equipment, except for a large opening 31 through which a man can enter the tank to service or repair the equipment mounted therein. A barrellike cylinder 32 is welded or otherwise secured to opening 31 and is provided at its outer end with a bolt-on cover plate 33. Cylinder 32 extends a short distance into tank 10 and, to prevent material from building up thereon, a slanting plate 34 is welded to the inner end of cylinder 32 and the inner wall of tank 10, as best shown in FIG. 4.

Figure 7:
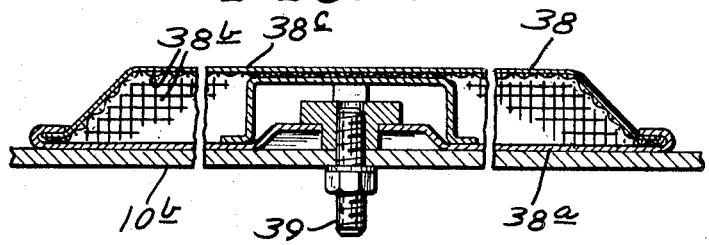
FIG. 7 is an enlarged sectional view of an aerator pad taken along line 7—7 of FIG. 3.

The interior wall of lower portion 10b is provided with equipment designed to aerate, blend and aid in transporting material carried by the tank. First of all, a plurality of aerator pads 38 are mounted at predetermined positions on the interior wall of lower portion 10b. As best shown in FIG. 7 each aerator pad 38 has a metal support frame 38a, a wire mesh grid 38b carried thereby, and a fabric diffuser 38c mounted over the wire grid. Air enters aerator pad 38 through a threaded nipple 39 that extends through an opening in the wall of lower portion 10b. A complete description of this type of aerator pad is given in the Schemm U.S. Pat. No. 2,665,035 that issued Jan. 5, 1954.

Each aerator pad 38 has a rectangular shape, with the length thereof being generally twice as long as the width. In the preferred embodiment of our invention, three horizontally spaced rows of aerator pads 38 are mounted around the interior wall of lower portion 10b. The upper row has eight aerator pads 38 spaced at equal intervals around the periphery of the tank just below the connection of the cylindrical portion with the conical portion. The lower row, located near the outlet opening 11 has four equally spaced aerator pads 38. In both the upper and the lower rows, the longitudinal axis of each aerator pad lies in a generally horizontal plane. The middle row of aerator pads 38 also includes eight pads, but these pads are mounted at approximately a 45° angle with respect to the horizontal. In general, aerator pads 38 are equally spaced over the inner wall surface of lower portion 10b.

Positioned generally between each of the aerator pads 38 in the middle row are a group of jet nozzles 40. A single jet nozzle 40 is mounted between each adjacent pair of aerator pads 38 in the middle row. Thus, there are a total of eight jet nozzles 40 in the preferred embodiment of our invention. This row of jet nozzles 40 also lies in a horizontal plane. As best shown in FIG. 5, each jet nozzle 40 has a threaded lower portion for connection into an opening in the wall of tank 10. Each jet nozzle 40 also has an octagonal upper portion designed to permit easy threading of the nozzle into the opening and adjustment thereafter. In the preferred embodiment, each nozzle 40 has an axial opening 40a extending through the threaded lower portion but terminating short of the top of the octagonal portion. An air outlet opening 40b extends outwardly from the axial opening through one of the faces of the octagonal portion. The axis of opening 40b forms approximately a 15° angle with respect to a line extending perpendicular to the axis of axial portion 40a. These jet nozzles 40 are thus constructed in a manner similar to that shown in the Anselman et al. U.S. Pat. No. Re. 24,716. As best shown in FIGS. 3 and 4, jet nozzles 40 are adjusted so that the air jets exit at approximately a 45° angle with respect to the horizontal, or generally parallel to the side edges of the aerator pads 38 in the middle row. Therefore, it can be seen that the purpose of placing the aerator pads 38 in the middle row at an angle is to permit the air jets emanating from the nozzles 40 to pass freely between the pads 38. Thus, the jets do not interfere with the fluidizing air emanating from the pads 38.

A pair of circular manifolds 45 and 46 are mounted around the exterior of tank 10 to provide air to the nozzles 40 and pads 38. Each of the manifolds 45 and 46 is basically a circular pipe that extends almost completely around tank 10 and is sealed at both ends. The manifolds are supported from the upper portion 10a by means of vertically extending frame members 47 welded to the tank. Manifolds 45 and 46 are each provided with a supply of air through pipes 48 and 49 respectively. Thus, each of the two manifolds can be provided with its own separate supply of air under pressure. The two manifolds are connected by a pipe 50 having a check valve 51 therein. Check valve 51 permits flow of air from manifold 46 to manifold 45 when the pressure in manifold 45 is lower than the pressure in 46, so that air will always flow through the jet nozzles 40 to prevent material from entering the nozzles and manifold 45.

Manifold 45 is connected to each of the jet nozzles 40 by means of hoses and coupling members shown somewhat schematically in FIG. 1. Therefore, all of the jet nozzles 40 will be provided with the same supply of air at the same pressure.

Manifold 46 is connected to each of the aerator pads 38 by means of similar flexible hoses and connectors, also shown schematically in FIG. 1. All of the aerator pads 38 will thus be supplied with the same source of air at the same pressure.

The control system for our invention is disclosed schematically in FIG. 1. A source of air under pressure is provided through a pipe 53. Three different secondary pipes 54, 55 and 56 lead from the source 53 to the pipe 48 leading to upper manifold 45. A single secondary pipe 57 leads to pipe 49 connected to lower manifold 46. A pair of secondary pipes 58 and 59 lead to pipe 15 supplying air to diffuser pad 13. Each of the secondary pipes 54—59 is provided with a pressure regulator valve shown schematically as having an adjustment handle and a pressure gauge. Pipes 54 and 55 are each provided with solenoid valves controlled from the control panel and with separate check valves. Pipe 57 is provided with a manually operable shutoff valve. Pipes 58 and 59 are each provided with solenoid valves operated from the control panel.

The air supply pipes leading to the shutoff valve 17 and the booster 18 are each provided with manual shutoff valves and with solenoid valves controlled by the control panel. A pair of air supply control valves 60 and 61, controlling air to the air motors 23 and 28 respectively, are also activated and deactivated by the control panel.

OPERATION

Several different types of discrete materials can be mixed and transported with this apparatus. For example, cement can be mixed with sand to provide a concrete mix. Various types of seed grains can be mixed together. Various abrasive materials can be mixed. Flour and various additives thereto can be mixed together and transported. In the glassmaking industry, the many different elements going into a glass batch can be mixed together into a homogenous mass and then transported to a remote location.

The first step is to fill the tank to the proper level. The best results are obtained if the tank is filled approximately one-half full so that sufficient headroom will be permitted for blending. The aerated material expands considerably during the blending operation so that sufficient headroom must always be provided. The tank is filled to the proper level through the tubular inlet conduit 21, with the butterfly valve 22 being in the open position. During the filling operation, butterfly valve 27 is open to permit air to escape and motor 30 is energized to agitate filter 29. Shutoff valve 17 is closed. The valve in line 57 is closed during filling as no air is needed through the aerator pads 38. The valves in lines 54 and 56 are closed but the valve in line 55 is open to provide air at approximately 10 p.s.i. to manifold 45, which air continuously exits through nozzles 40 to prevent material from entering the open nozzles. As there is no danger of plugging the diffuser pad 13, the valves in both of the lines 58 and 59 are closed. Thus, during the fill operation, the only air entering the tank is from the nozzles 40, which air exits through conduit 25 and through filter 29.

After the tank is filled to the desired level, the control system is shifted to the blending mode. In the blending mode, butterfly valve 22 is closed but butterfly valve 27 is left open to permit air to escape. Shutoff valve 17 remains closed. Two sources of air are provided to aerate or fluidize the material carried in the tank. First of all, air at approximately 8 p.s.i. (5—10 p.s.i.) is supplied through line 58 to diffuser pad 13. This relatively low-pressure air escapes from diffuser pad 13 over the entire surface thereof and moves upwardly through the material in tubular member 12 and through the material in the cone-shaped lower portion 10b. This air form diffuser pad 13 fluidizes the material in the lower part of the tank and permits the material to be agitated by the jets as will be described. Fluidizing air also enters the tank through each of the aerator pads 38. This air is supplied from line 57 at approximately 8 p.s.i. (5—10 p.s.i.). Because of the wide distribution of the aerator pads 38, this fluidizing air is supplied over a wide surface area of the material in the tank. We have found that the aerator pads 38 and the diffuser pad 13, if used together in this manner, will fluidize the entire batch of material carried in the tank. To actually stir or blend the material, manifold 45 is provided with intermittent high-pressure air at approximately 80 p.s.i. from line 56. The solenoid valve in line 56 is opened and closed at predetermined intervals by means of a timer 63 operated by the control panel. We have found that excellent blending is achieved with this system if the valve in line 56 is cycled, 3 seconds open and 3 seconds closed. With this cycle, the jet nozzles 40 each provide a 3 second jet of air at approximately 80 p.s.i. every 3 seconds. As the jets are set at approximately a 45° angle with respect to the horizontal, these air jets cause the material to swirl and agitate in the tank. With some light materials, complete blending will take place in less than a minute. With other materials, it will take 10 minutes or more to obtain complete blending. A few experimental runs with the equipment will tell the operator how long the blending operation should take for any given batch of material.

We have found that the cycling of the nozzles 40 is quite important. If the high-pressure air through the nozzles is merely left on continuously, the jets merely drill a hole through the material but do not excite the material so as to obtain complete blending. The pulsating jets, on the other hand, excite the fluidized material and cause it to blend completely within a very short time. We have found that a cycle of 3 seconds on and 3 seconds off works very efficiently, but other cycles may work as well.

It should be pointed out that when the valve in high-pressure air line 56 closes, it is desirable to keep some air passing through the jet nozzles 40 to prevent material from entering the nozzles. This is accomplished by providing the line 50 between the lower manifold 46 and the upper manifold 45. When the high-pressure valve is closed and the pressure in manifold 45 dissipates, air from manifold 46 passes through the check valve 51 to provide a continuous flow of air through the nozzles 40.

After the blending is completed, the system is again recycled to transport the material from tank 10 through outlet conduit 14 to a remote location. To shift the system to the transport mode, the control panel continues to hold butterfly valve 22 in the closed position and butterfly valve 27 is also closed. Both of these butterfly valves provide a positive seal so that air cannot escape from the system. At the same time, shutoff valve 17 is opened and booster 18 is energized by opening the solenoid valve in supply pipe 18a. At this point, the only outlet from the tank for air or material is material outlet conduit 14.

In order to transport the material, it must be completely fluidized and subjected to pressure so that it will flow freely out through the valve 17 into conduit 14. To do this, the pressure in the tank is increased by closing the valve in line 58 and opening the valve in line 59 to provide air at approximately 35—55 p.s.i. through air supply conduit 15 into diffuser pad 13. The valve in line 57 is closed so that no air is being supplied through the aerator pads 38. Further, with this valve closed, no air can escape outwardly through the aerator pads. A new supply of air is provided to the jet nozzles 40, this time through line 54 at approximately 25—55 p.s.i. During this transport mode of operation, air is supplied continuously at this pressure to the interior of the tank through the jet nozzles 40. The material in the tank, which has been aerated by the diffuser pad 13, is caused to swirl around the tank about its vertical axis to aid in forcing it from the tank through conduit 14. The pressure in the tank during the transport mode is thus between 35 and 55 p.s.i., again depending upon the type of material in the tank and the operator's experience with that type of material. Transporting the material from the tank in this manner takes only a few minutes, making the system again available for filling with a new batch.

Another important feature of our invention, not previously mentioned, is the cone-shaped member 65 mounted directly above material outlet opening 11 by means of a cross frame 66 welded to the inner walls of the tank. Member 65 has a circular base and, as previously mentioned, is cone-shaped. We have found that the presence of member 65 greatly enhances the transporting operation. For one thing, it prevents material from bridging across opening 11 because only an annular opening remains between it and the walls of tank 10. All the air from diffuser pad 13 moves upwardly through this annular opening, making it virtually impossible for material to bridge the gap. Because the upper surface of member 65 is convex, it cannot catch any material or prevent the material from leaving the tank during the transport mode. The important feature of member 65 is the formation of the annular passage to prevent bridging. The conical shape prevents buildup of material so that the tank is completely emptied each time.

We believe that the combination blender and transporter unit described herein provides a thorough blending and transporting capability not available with prior art equipment. The pressures we have outlined above have worked well in the applications with which we are familiar, but it is very possible that variations in these preferred pressures will achieve the desired results in a particular situation. Apparatus of this size and expense is usually purchased for use in a particular plant to mix generally the same types of ingredients from day to day. Therefore, a certain amount of experimentation is normally required when the equipment is installed to achieve optimum results. Our invention has been thoroughly tested and has performed satisfactorily under a wide variety of conditions.

What we claim is:

1. A combination blender and transporter unit for powdered or granular materials, comprising:
   a. a vessel having an upper portion with a closable material inlet opening therein and a lower portion converging downwardly from said upper portion to a material outlet opening at the bottom end thereof;
   b. a plurality of aerator pads mounted at predetermined positions on the interior wall of said lower portion;
   c. means for supplying air to said pads to aerate material carried in said vessel;
   d. a plurality of air jet nozzles mounted at predetermined positions on the interior wall of said lower portion;
   e. means for supplying relatively high-pressure air to said jet nozzles at periodic intervals during blending to agitate and blend the material in said vessel; and
   f. means mounted on said vessel at said material outlet opening to aid in blending said material and to subsequently transport said blended material from said vessel.

2. The apparatus of claim 1 wherein said upper portion of said vessel is provided with an air outlet opening, filter means to filter said material from the air passing through said air outlet opening during blending, and valve means to close off said air outlet opening during transporting.

3. The apparatus of claim 1 wherein said lower portion is generally conically shaped, wherein said aerator pads are positioned at generally equal intervals on said interior wall, and wherein said means for supplying air to said pads includes an air supply manifold extending around the outer periphery of said vessel and conduit means connecting said manifold to said pads through openings in the wall of said vessel.

4. The apparatus of claim 3 wherein said pads are generally rectangular and are positioned in horizontally spaced rings with the pads in at least one of said rings being positioned with the longitudinal axis thereof forming an acute angle with the horizontal, and wherein said air jet nozzles are positioned generally between said pads in said one ring so as to direct air jets generally along said wall surface and at generally said same acute angle with respect to the horizontal.

5. The apparatus of claim 1 wherein said air jet nozzles each have an air jet outlet and are positioned at generally equal intervals around said interior wall, said jet nozzles being connected to said vessel for rotation with respect thereto so that the direction of said air jet outlet can be changed.

6. The apparatus of claim 5 wherein said air jet nozzles are positioned in a generally horizontal ring between adjacent pairs of said aerator pads, and wherein said means for supplying air to said jet nozzles includes an air supply manifold extending around the outer periphery of said vessel and conduit means connecting said manifold to said jet nozzles through openings in the wall of said vessel.

7. The apparatus of claim 1 wherein said air jet nozzles are positioned at generally equal intervals around said interior wall and are directed such that the air jets issuing therefrom cause the material to be carried around in said vessel about a generally vertical axis extending through the center thereof.

8. The apparatus of claim 1 wherein diffuser pad means are mounted between said material outlet opening and a material outlet conduit, wherein means are provided to supply air to said diffuser pad means at a relatively low pressure during blending to aid in aerating and blending said material in said vessel, and wherein means are provided to alternately supply air to said diffuser pad means at a higher pressure to transport said blended material from said vessel into said outlet conduit.

9. The apparatus of claim 8 including valve means mounted in said outlet conduit, means to close said valve means during blending and to open said valve means during transporting, and air booster means mounted in said conduit to aid in transporting said material therethrough.

10. The apparatus of claim 8 including means for supplying a steady flow of air at a lower pressure to said jet nozzles during blending, and means for supplying a steady flow of air at a still lower pressure to said air nozzles during filling of said vessel.

11. The apparatus of claim 1 including an inverted, generally cone-shaped member mounted over said material outlet opening to prevent bridging across the opening, said cone-shaped member being positioned to leave an annular opening between the bottom edge thereof and said wall of said lower portion of said vessel.

12. A blender unit for discrete materials, comprising:
a. a vessel having an upper portion with a material inlet opening therein and a generally conical lower portion converging downwardly from said upper portion converging downwardly from said upper portion to a material outlet opening at the bottom end thereof;
b. a plurality of aerator pads mounted at predetermined positions on the interior wall of said conical lower portion;
c. means for supplying a flow of air to said pads to aerate material carried in said vessel;
d. a plurality of air jet nozzles mounted at predetermined positions on the interior wall of said conical lower portion;
e. means for supplying intermittent high-pressure air to said jet nozzles to agitate and blend the material in said vessel; and
f. means associated with said material outlet opening to remove said blended material from said vessel.

13. The apparatus of claim 12 wherein said means associated with said outlet opening includes a diffuser pad having air supply means to aid in aerating said material during blending and to remove said material from said vessel during transporting.

14. The apparatus of claim 12 including a member mounted in said vessel above said material outlet opening so that an annular opening is provided between said member and said walls, to prevent bridging of said material across said opening.

15. A combination blender and transporter unit for discrete material, comprising:
a. a vessel having an upper portion with a material inlet opening therein, and a lower funnel-shaped portion having a material outlet opening at the bottom end thereof;
b. means for supplying a steady flow of air into said material along the walls of said funnel-shaped portion to aerate said material carried in said vessel;
c. means for introducing relatively high-pressure jets of air into said material at periodic intervals during blending to agitate and blend the material in said vessel; and
d. means mounted on said vessel at said material outlet opening alternately to aid in blending said material and to transport said blended material from said vessel.

16. A method of blending discrete materials in a vessel having an upper portion with a closable material inlet opening therein and a lower portion converging downwardly from the upper portion to a material outlet opening at the bottom end thereof, and subsequently transporting said blended materials from said vessel, comprising:
a. filling said vessel with said materials to a predetermined level through said inlet opening;
b. closing said material inlet and outlet openings;
c. aerating said materials in said vessel by supplying a continuous flow of air to said materials over a wide area thereof, and permitting said air to escape continuously from said vessel;
d. agitating and blending said aerated materials by introducing relatively high-pressure jets of air into said material at periodic intervals; and
e. opening said material outlet opening after blending is complete, closing all other vessel openings, and subjecting the interior of said vessel to relatively high-air pressure to aerate said material and force the aerated material out through said material outlet opening.

17. A method of blending and transporting a batch of discrete materials, comprising:
a. fluidizing said batch of materials by supplying a continuous flow of air at a first pressure to said materials over widely distributed areas thereof;
b. blending said fluidized materials by subjecting the materials to pulsating high pressure jets of air; and
c. discontinuing said pulsating jets after blending is complete and subjecting said blended materials to a static pressure higher than said first pressure while continuing to fluidize said materials to transport the materials to a different location.